United States Patent
Nakamura (10) Patent No.: US 8,103,383 B2
(45) Date of Patent: Jan. 24, 2012

(54) MOBILE APPARATUS, CONTROL DEVICE AND CONTROL PROGRAM

(75) Inventor: Makoto Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 12/062,000

(22) Filed: Apr. 3, 2008

(65) Prior Publication Data

US 2008/0249662 A1    Oct. 9, 2008

(30) Foreign Application Priority Data

Apr. 6, 2007    (JP) ................................. 2007-100000

(51) Int. Cl.
  *G05B 19/19*   (2006.01)
  *G08G 1/16*    (2006.01)
  *B25J 5/00*    (2006.01)

(52) U.S. Cl. ........ 700/255; 700/245; 700/250; 701/300; 318/568.12

(58) Field of Classification Search .................... 701/23, 701/117, 301, 302, 26, 300; 700/255, 259, 700/253, 245, 248, 250; 340/435, 436; 901/1, 901/49, 50; 318/568.12
See application file for complete search history.

(56) References Cited

U.S. PATENT DOCUMENTS

| | | | | |
|---|---|---|---|---|
| 6,463,368 B1 * | 10/2002 | Feiten et al. | ............ | 701/23 |
| 7,194,347 B2 * | 3/2007 | Harumoto et al. | ............ | 701/45 |
| 7,259,660 B2 * | 8/2007 | Ewerhart et al. | ............ | 340/436 |
| 7,617,048 B2 * | 11/2009 | Simon et al. | ............ | 701/301 |
| 2004/0093160 A1 * | 5/2004 | Knoop et al. | ............ | 701/301 |
| 2007/0282530 A1 * | 12/2007 | Meister et al. | ............ | 701/301 |
| 2008/0097699 A1 * | 4/2008 | Ono | ............ | 701/300 |

FOREIGN PATENT DOCUMENTS

| | | |
|---|---|---|
| JP | 2006-079325 | 3/2006 |
| JP | 2006-167844 | 6/2006 |

OTHER PUBLICATIONS

Pacchierotti et al., "Embodied social interaction for service robots in hallway environments" Proc. of the International Conference on Field and Service Robotic, Jul. 2005.*
James J. Kuffner, Steven M. Lavalle, "RRT-Connect: An Efficient Approach to Single-Query Path Planning", Proceedings of the 2000 IEEE International Conference on Robotics and Automation (ICRA 2000), English text.

* cited by examiner

*Primary Examiner* — Thomas Black
*Assistant Examiner* — Christine Behncke
(74) *Attorney, Agent, or Firm* — Rankin, Hill & Clark LLP (57) ABSTRACT

A mobile apparatus or the like capable of moving or acting while surely preventing contact with an object such as a human being, by avoiding the situation where the object inappropriately changes its behavior for the purposes of preventing contact with the mobile apparatus, is provided. According to the robot of the present invention, a path that can prevent contact with the third spatial element satisfying the requirement regarding the size in the element space, among a plurality of expanded spatial elements arranged around the first spatial element, is set as a target path. This allows the robot to move in accordance with a consistent rule that is modified in response to the width of the clearance between the object and the boundary of the passable region.

9 Claims, 10 Drawing Sheets

MOBILE APPARATUS, CONTROL DEVICE AND CONTROL PROGRAM

BACKGROUND OF THE INVENTION

1. Field of the Invention

The present invention relates to an apparatus or the like which autonomously moves along a target path.

2. Description of the Related Art

As robots have become more sophisticated in functionality, there are increasing opportunities for the robots to perform jobs or works such as carrying luggage or guiding human beings to their destinations, and the need for the robots to move while preventing contact with the human beings is increasing. In this relation, a technique to decrease the traveling speed of a robot based on a result of determination that the obstacle is a human being has been proposed (see Japanese Patent Application Laid-Open No. 2006-79325). Further, a technique to cause a robot to move along a path having a shortest moving distance to a target point among a plurality of paths for preventing contact with an obstacle has been proposed (see Proc. 2000 IEEE International Conference on Robotics and Automation (ICRA 2000) "RRT-Connect: An Efficient Approach to Single-Query Path Planning").

When the traveling speed of the robot is decreased, however, the human beings around the robot may feel uncomfortable about the behavioral change of the robot. Thus, it is difficult for the robot to move while cooperating with the human beings surrounding it.

Further, it is unclear for the human beings how the robot sets its target path and, hence, how the robot will change its direction. There may be a case where, when the human being expects that the robot will shift its position to his/her right and thus moves to the left, the robot also moves to its right. This may rather increase the possibility that the human being and the robot come to contact with each other due to the behavioral change of the human being based on the false prediction. Thus, it is difficult for the robot to move while cooperating with the human beings surrounding it.

SUMMARY OF THE INVENTION

In view of the foregoing, an object of the present invention is to provide a mobile apparatus or the like capable of moving or acting while reliably preventing contact with an object such as a human being, by preventing the undesirable situation where the object inappropriately changes its behavior for the purposes of preventing contact with the mobile apparatus.

A mobile apparatus according to a first aspect of the present invention is a mobile apparatus that autonomously moves along a target path, wherein the mobile apparatus includes a control device, and the control device includes: a first processing element which recognizes states of a region where the mobile apparatus is passable, the mobile apparatus, and an object as states of an element space, a reference spatial element, and a first spatial element, respectively; a second processing element which, based on a recognition result of the first processing element, recognizes one of a plurality of expanded spatial elements arranged around the first spatial element that satisfies a requirement regarding a size in the element space as a third spatial element; and a third processing element which, based on recognition results of the first and second processing elements, sets a path that allows the reference spatial element to prevent contact with the first spatial element and the third spatial element in the element space as the target path.

According to the mobile apparatus of the first aspect of the present invention, the path that can prevent contact with the "third spatial element" satisfying a requirement regarding the size in the element space, among the plurality of expanded spatial elements arranged around the first spatial element, is set as the target path. As used herein, the "spatial element" in the element space refers to the "point" for which its position, velocity, acceleration and other states in the element space can be defined, the "line segment" for which its shape, length and other states in addition to the position and the like in the element space can be defined, the "region" for which its shape, area and other states in addition to the position and the like in the element space can be defined, and the like. Further, the expanded spatial elements arranged around the first spatial element have their sizes in the element space varying in accordance with the width of the clearance between the object, recognized as the first spatial element, and the boundary of the passable region where the mobile apparatus is capable of pass, recognized as the element space.

Accordingly, it is possible to cause the mobile apparatus to move in accordance with a consistent rule that is modified in response to the width of the clearance between the object and the boundary of the passable region. This allows the object such as a human being to predict the behavior of the mobile apparatus based on the position of the object with respect to the boundary of the passable region such as a wall surface of a passage way or the like. It is thus possible to encourage the object to make an appropriate behavior or behavioral change, based on the above prediction, for the purposes of preventing contact with the mobile apparatus, without causing the object to feel uncomfortable.

As used herein, that the component of the present invention "recognizes" the information means that the component performs every kind of information processing, such as searching a database for the information, reading the information from a storage device such as a memory, measuring, calculating and estimating the information based on the output signals of the sensors and the like, and storing the measured information and the like in a memory, which is necessary for the information to be prepared or ready for further information processing. Further, when a plurality of objects moves in an integrated manner, as in the case where an object is attached to another object, the objects may collectively be recognized as the first spatial element.

A mobile apparatus according to a second aspect of the present invention is characterized in that, in the mobile apparatus of the first aspect of the present invention, the second processing element regards a plurality of regions of same shape and same area arranged at an equal distance from the first spatial element as the plurality of expanded spatial elements, and regards an overlapping area of each of the plurality of regions with the element space as the size of the expanded spatial element, for recognition of the third spatial element.

According to the mobile apparatus of the second aspect of the present invention, it is possible to cause the mobile apparatus to move in accordance with a consistent rule that is modified in response to the width of the clearance between the object and the boundary of the passable region, which is represented by the size of the overlapping area of each of the regions, recognized as the expanded spatial elements arranged around the first spatial element, with the element space.

A mobile apparatus according to a third aspect of the present invention is characterized in that, in the mobile apparatus of the first aspect of the present invention, the second processing element regards a plurality of line segments of same shape extending from the first spatial element in different directions as the plurality of expanded spatial elements, and regards a length of a part of each of the plurality of line segments continuing from the first spatial element to a boundary of the element space as the size of the expanded spatial element, for recognition of the third spatial element.

According to the mobile apparatus of the third aspect of the present invention, it is possible to cause the mobile apparatus to move in accordance with a consistent rule that is modified in response to the width of the clearance between the object and the boundary of the passable region, which is represented by the length of the part of each of the line segments, recognized as the expanded spatial elements extending from the first spatial element, that continues from the first spatial element to the boundary of the element space.

A mobile apparatus according to a fourth aspect of the present invention is characterized in that, in the mobile apparatus of the first aspect of the present invention, the second processing element recognizes one of the plurality of expanded spatial elements that satisfies the requirement that its size in the element space is the smallest or not greater than a threshold value as the third spatial element.

According to the mobile apparatus of the fourth aspect of the present invention, a target path is set in the region where the clearance between the object and the boundary of the passable region is wide by avoiding the region where the clearance is narrow. It is thus possible to cause the mobile apparatus to move in accordance with a consistent rule that the mobile apparatus moves to the region having the wider clearance between the object and the boundary of the passable region. This allows the object such as a human being to predict that the mobile apparatus will move to the region where the clearance between the object and the boundary of the passable region is wider. It is thus possible to encourage the object to make an appropriate behavior or behavioral change, based on the above prediction, for the purposes of preventing contact with the mobile apparatus, without causing the object to feel uncomfortable.

A mobile apparatus according to a fifth aspect of the present invention is characterized in that, in the mobile apparatus of the first aspect of the present invention, the first processing element recognizes behavioral states of the mobile apparatus and the object as behavioral states of the reference spatial element and the first spatial element, respectively, in the element space, the second processing element, based on a recognition result of the first processing element, recognizes the first spatial element expanded intermittently or continuously in accordance with the behavioral states in the element space a second spatial element, and the third processing element, based on recognition results of the first and second processing elements, sets a path that allows the reference spatial element to prevent contact with the third spatial element and with the second spatial element incorporating the first spatial element in the element space as the target path.

According to the mobile apparatus of the fifth aspect of the present invention, the first spatial element expanded based on the behavioral states of the reference and first spatial elements in the element space is recognized as the second spatial element. The behavioral state of each spatial element is defined by a part or all of the position, velocity, acceleration and the like that change over time. Thus, the second spatial element is recognized as a spatial element having a size or spatiality greater than that of the first spatial element. Further, a path that allows the reference spatial element to prevent contact with the second spatial element is set as the target path of the mobile apparatus. Thus, compared to the case where the target path that allows the reference spatial element to prevent contact with the first spatial element or other spatial element smaller than the second spatial element is set, a more appropriate target path can be set from the standpoint of more reliably preventing the mobile apparatus from contacting the object in consideration of the behavioral state of the object.

A mobile apparatus according to a sixth aspect of the present invention is characterized in that, in the mobile apparatus of the fifth aspect of the present invention, the second processing element determines whether there is a possibility of contact between the reference spatial element and the first spatial element in the element space based on the recognition result of the first processing element, and the third processing element newly sets the target path on the condition that the second processing element determines that there is the possibility of contact.

According to the mobile apparatus of the sixth aspect of the present invention, the first spatial element is recognized as a spatial element having the size or spatiality smaller than that of the second spatial element in the element space, and the requirement for setting a new target path is that the reference spatial element may possibly contact the first spatial element. Accordingly, compared to the case where the requirement for setting a new target path is that the reference spatial element may possibly contact the second spatial element or other spatial element greater in size than the first spatial element, the frequency of change of the target path, and hence, the frequency of behavioral change of the mobile apparatus such as a change of direction is restricted low. This reduces the possibility that the behavioral change of the mobile apparatus would induce the behavioral change of the object, thereby rather increasing the possibility of contact therebetween.

A control device according to a seventh aspect of the present invention is a device for controlling an operation of a mobile apparatus autonomously moving along a target path, wherein the device includes: a first processing element which recognizes states of a region where the mobile apparatus is passable, the mobile apparatus, and an object as states of an element space, a first spatial element, and a first spatial element, respectively; a second processing element which, based on a recognition result of the first processing element, recognizes one of a plurality of expanded spatial elements arranged around the first spatial element that satisfies a requirement regarding a size in the element space as a third spatial element; and a third processing element which, based on recognition results of the first and second processing elements, sets a path that allows the reference spatial element to prevent contact with the first spatial element and the third spatial element in the element space as the target path.

According to the control device of the seventh aspect of the present invention, it is possible to cause the mobile apparatus to move in accordance with a consistent rule that is modified in response to the width of the clearance between the object and the boundary of the passable region.

A program according to an eighth aspect of the present invention is characterized in that it causes a computer mounted on a mobile apparatus that autonomously moves along a target path to function as the control device of the seventh invention.

According to the program of the eighth aspect of the present invention, it is possible to cause the computer mounted on the mobile apparatus to function as the device that controls the behavior of the mobile apparatus so that it moves in accordance with a consistent rule that is modified in response to the width of the clearance between the object and the boundary of the passable region.

BRIEF DESCRIPTION OF THE DRAWINGS

FIG. 5 illustrates a result of recognition of a reference spatial element and the like.

DESCRIPTION OF THE PREFERRED EMBODIMENTS

Embodiments of a mobile apparatus and others of the present invention will now be described with reference to the drawings.

Figure 1:
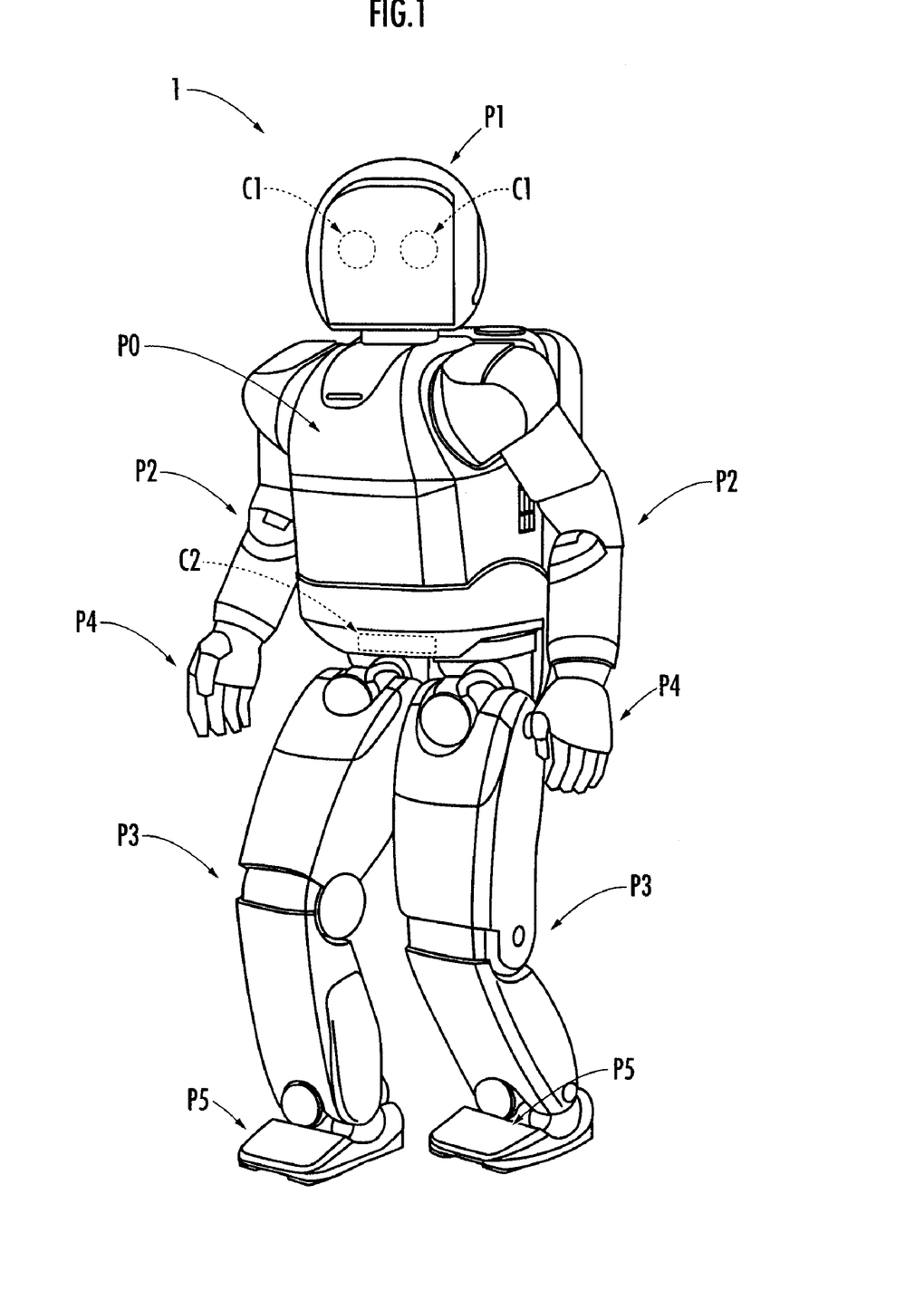
FIG. 1 illustrates the configuration of a mobile apparatus (robot) of the present invention.

A robot 1 as a mobile apparatus includes: a body (trunk of the body) $P_0$, a head $P_1$ provided on top of the body $P_0$, left and right arms $P_2$ extended from the respective left and right sides of an upper part of the body $P_0$, a hand $P_4$ provided at an end of each of the arms $P_2$, left and right legs $P_3$ extended downward from a lower part of the body $P_0$, and a foot $P_5$ provided at an end of each of the legs $P_3$. The robot 1 is capable of bending and stretching the arms $P_2$ and the legs $P_3$ at a plurality of joint portions corresponding to the joints of a human being, such as shoulder, elbow, carpal, hip, knee, and ankle joints, by the force transmitted from an actuator M (see FIG. 2), as disclosed in Japanese Re-Publications of PCT International Publications Nos. 03/090978 and 03/090979. The robot 1 can autonomously move with the left and right legs $P_3$ (or the feet $P_5$) repeatedly taking off and landing on the floor. The height of the head $P_1$ may be adjusted through adjustment of the tilt angle of the body $P_0$ with respect to the vertical direction. The head $P_1$ is mounted with a pair of head cameras (CCD cameras) $C_1$ arranged side by side to face forward of the robot 1. The body $P_0$ is mounted with a waist camera (infrared camera) $C_2$ in front at the lower part. The robot 1 is mounted with various sensors S (see FIG. 2) which include a gyro sensor that outputs a signal responsive to the acceleration of the body $P_0$, a rotary encoder that outputs a signal responsive to the joint angle of each joint, and a 6-axis force sensor that outputs a signal responsive to the floor reaction force acting on the legs $P_3$.

The robot 1 includes a control device 10 which controls operations of the arms $P_2$, legs $P_3$ and others. The control device 10 is configured with an ECU or computer (constructed by CPU, ROM, RAM, I/O and others) serving as hardware and a "control program" of the present invention serving as software. While the control program may be pre-stored in a memory of the computer, it may be distributed or broadcast to the computer via a network or an artificial satellite by a server in response to a request signal transmitted from the robot 1 to the server, and then stored in the memory.

Figure 2:
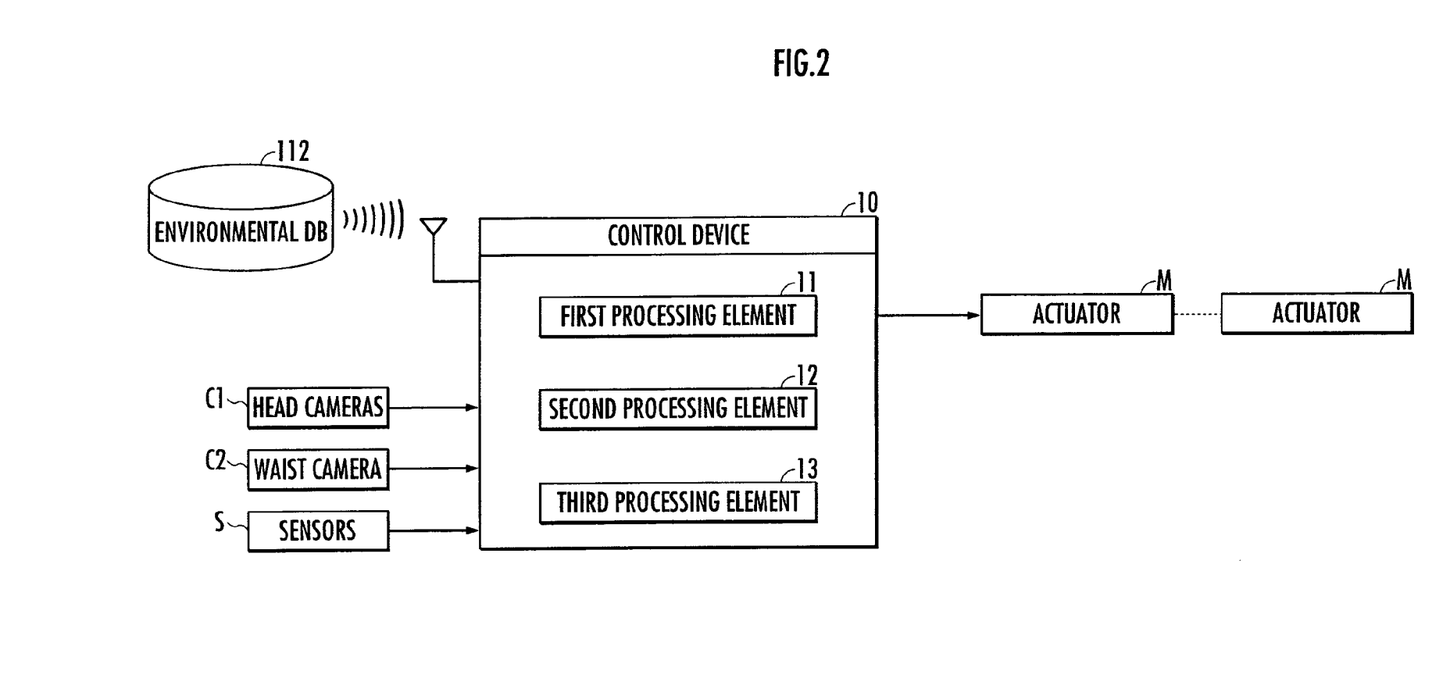
FIG. 2 illustrates the configuration of a control device of the present invention.

The control device 10 shown in FIG. 2 includes a first processing element 11, a second processing element 12, and a third processing element 13.

The first processing element 11 accesses an environmental database 112 via a radio system to recognize the region through which the robot 1 can travel or pass as an element space QS. The environmental database 112 manages data indicating the shape, area and others of the region where the robot 1 is passable. It is noted that the environmental database 112 may be mounted on the robot 1 as a part of the control device 10. Further, the first processing element 11 recognizes the robot 1 and its behavioral states, such as its position, velocity and the like, as a reference spatial element $Q_1$ and its behavioral states in the element space QS, based on the output signals of the sensors S and the like. Furthermore, the first processing element 11 recognizes the object 2 and its behavioral states, such as its position, velocity and the like, as a first spatial element $Q_2$ and its behavioral states in the element space QS, based on the images of the surroundings of the robot 1 picked up by either or both of the head cameras $C_1$ and the waist camera $C_2$.

The second processing element 12 recognizes the first spatial element $Q_2$ expanded intermittently or continuously based on the recognition result of the first processing element 11 as a second spatial element $EQ_2$. Further, the second processing element 12 recognizes one of a plurality of expanded spatial elements $Q_{3i}$ (i=1, 2, . . . ) arranged around the first spatial element $Q_2$ that satisfies a requirement regarding the size in the element space QS as a third spatial element $Q_{3+}$, based on the recognition result of the first processing element 11.

The third processing element 13 sets a path that allows the reference spatial element $Q_1$ to prevent contact with the first spatial element $Q_2$, the second spatial element $EQ_2$ and the third spatial element $Q_{3+}$ in the element space QS as a target path $R_k$ of the robot 1 in the real space or in the passable region, based on the recognition results of the first processing element 11 and the second processing element 12.

Figure 4:
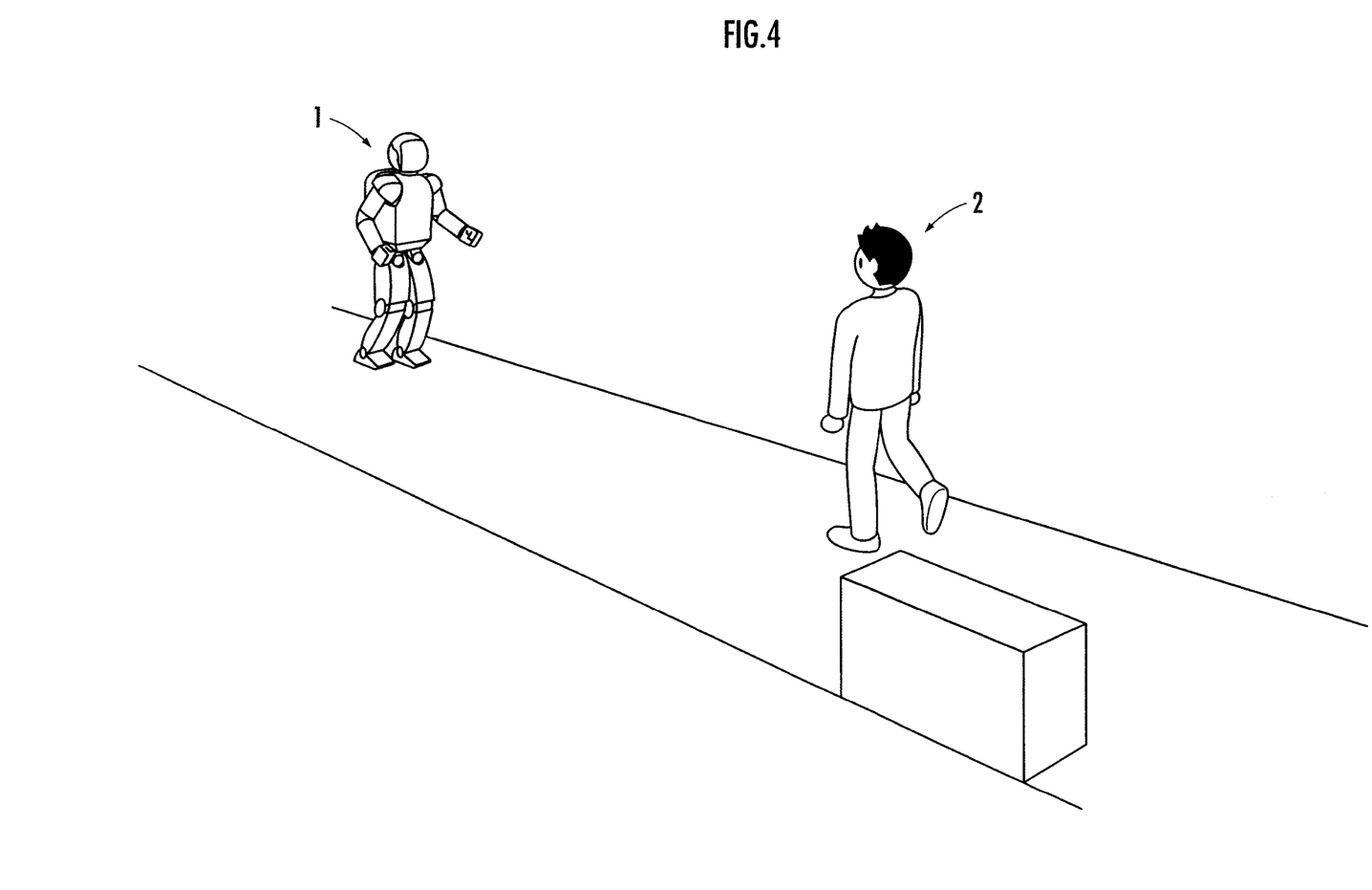
FIG. 4 illustrates a situation of a robot and an object.

Now, the functions of the robot having the above-described configuration will be described. The situation as shown in FIG. 4 is assumed in which the robot 1 and an object (human being) 2 are moving, while facing each other, in a corridor (passable region) delimited by the left and right walls. In this case, the robot 1 is walking or running along the target path $R_k$ indicated by a dashed line in FIG. 5, for example. The target path $R_k$ is preset in the initial state (k=0), and updated whenever necessary by the third processing element 13, as will be described later.

Figure 3:
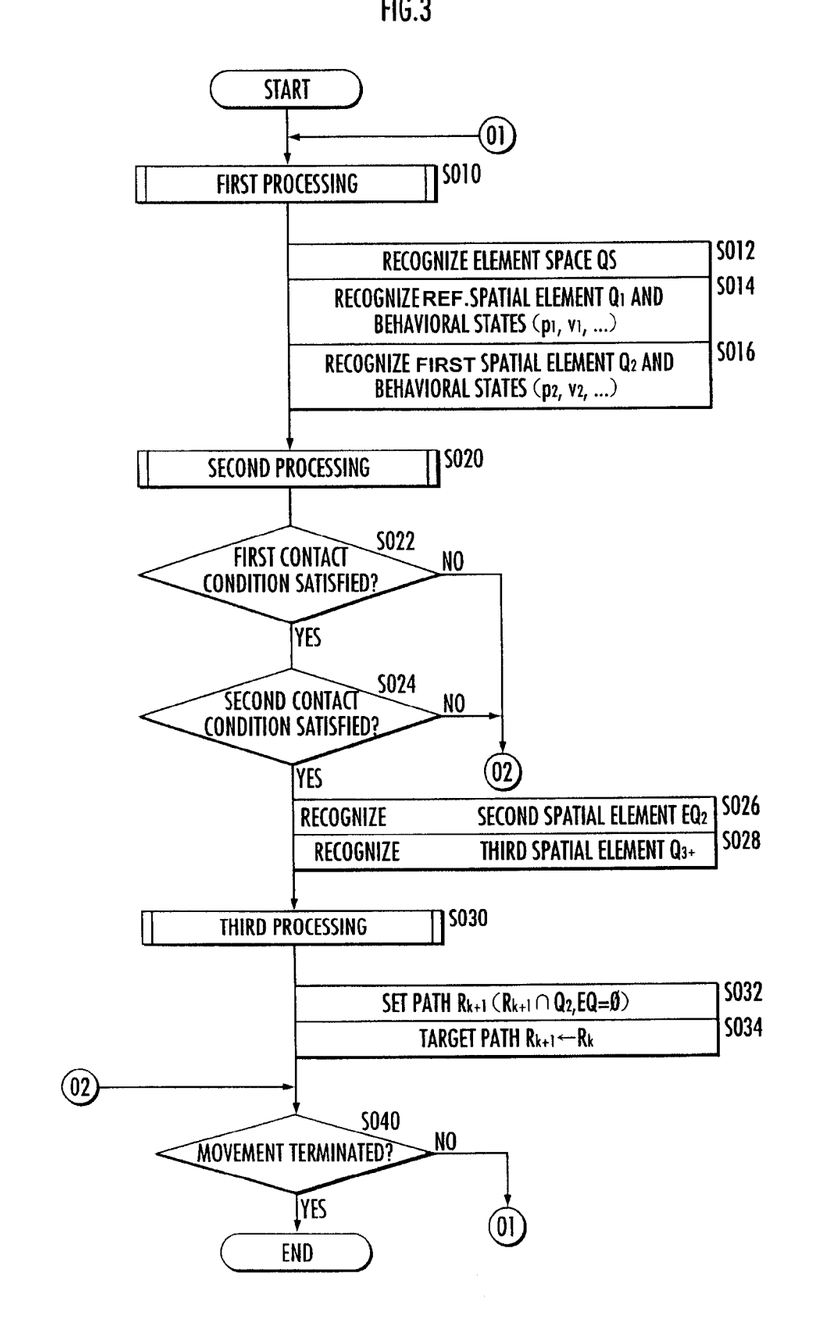
FIG. 3 is a flowchart illustrating a method of controlling a mobile apparatus of the present invention.
Figure 5:
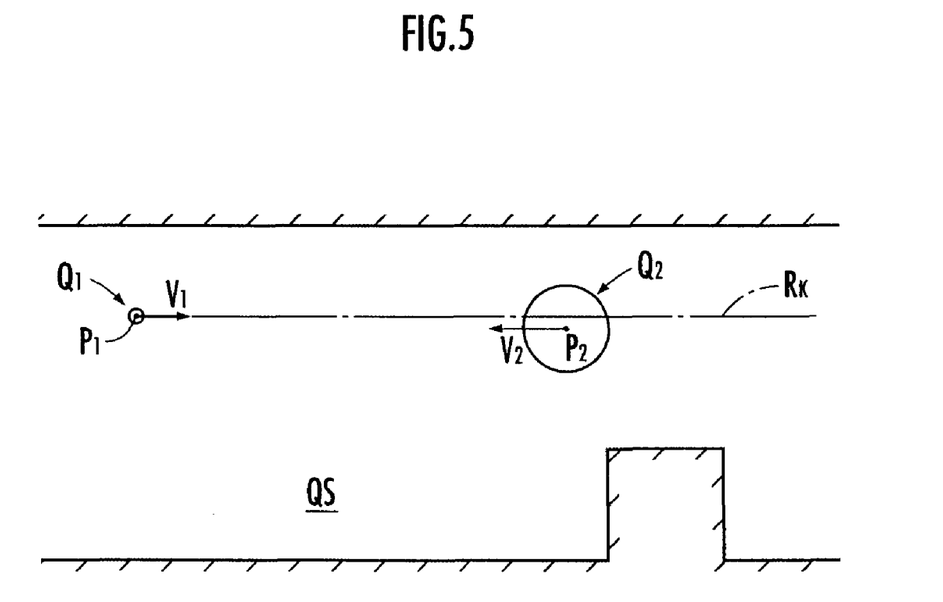

Firstly, the first processing element 11 carries out "first processing" (S010 in FIG. 3). Specifically, the first processing element 11 accesses the environmental database 112 via a radio system to recognize the region where the robot 1 can pass as the element space QS (S012 in FIG. 3). In this manner, the element space QS in accordance with the shapes of the corridor and fixed structures as shown e.g. in FIG. 4, and having the shape and area as shown e.g. in FIG. 5, is recognized.

Further, the first processing element 11 recognizes the robot 1 and its behavioral states, such as its position, velocity and the like, in the global coordinate system as the reference spatial element $Q_1$ and its behavioral states in the element space QS, based on the output signals of the sensors S and the like (S014 in FIG. 3). The position of the robot 1 is measured based on the signals representing the latitude and longitude obtained by its GPS function, or the signals representing the acceleration of the robot 1 sequentially output from the gyro sensor. The velocity of the robot 1 may be measured based on the positions of the robot 1 measured in time series, the output signals from the gyro sensor, or the output signals from the rotary encoder responsive to the joint angles of the legs $P_3$, and the inverse dynamics model. In this manner, the robot 1 and its position and velocity are recognized as the reference spatial element (small circular region) $Q_1$, the first position (center of the small circular region) $p_1$ the first velocity $v_1$, respectively, in the element space QS as shown e.g. in FIG. 5.

Furthermore, the first processing element 11 recognizes the object 2 and its behavioral states, such as its position, velocity and the like, as the first spatial element $Q_2$ and its behavioral states in the element space QS, based on the images of the surroundings of the robot 1 picked up by either or both of the head cameras $C_1$ and the waist camera $C_2$ (S016 in FIG. 3). Since the position of the object 2 in the robot coordinate system measured based on the images obtained by the head cameras $C_1$ and/or the waist camera $C_2$ corresponds to the relative position of the object 2 with respect to the robot 1, it is converted to the position in the global coordinate system based on the position of the robot 1 in the global coordinate system. In this manner, the object 2 and its position and velocity in the global coordinate system are recognized as the first spatial element (circular region) $Q_2$, the second position $P_2$ and the second velocity $v_2$, respectively, in the element space QS as shown e.g. in FIG. 5.

The shape and size of the reference spatial element $Q_1$ in the element space QS may be recognized by reading them from a memory (where the shape and size of the robot 1 are stored). The shape and size of the first spatial element $Q_2$ in the element space QS may be recognized, after the type of the object 2 is recognized based on the images of the surroundings of the robot 1 obtained by the head cameras $C_1$ and the like, by referring to the memory or database (where the types, shapes and sizes of the objects are associated with each other and stored or managed) based on the recognition result. Further, the position of the object 2 may be measured or recognized, when signals representing the latitude and longitude of the object 2 are received from a communication device or the like mounted on the object 2, based on these signals. Furthermore, the velocity of the object 2 may be measured as the change in position of the object 2 over time. While the element space QS may be defined as a flat surface or a curved surface on which a given point is specified by the latitude and longitude, it may be defined sequentially based on the shape of the floor surface around the robot 1, such as its tilt angle, presence/absence of steps or irregularities, recognized from the images obtained by the head cameras $C_1$ and the like.

In the case where a box, an instrument, or other object is moving with the robot 1 in an integrated manner, for example when the robot 1 is carrying the box with its arms $P_2$ or when the optional instrument is attached to the body $P_0$ to provide the robot 1 with an additional function, the shapes and sizes of the robot 1 and the object that are moving together may be recognized as the shape and size of the robot 1.

The region corresponding to the geometric characteristics (shape and size) of the object 2 and expanded in response to the geometric characteristics of the robot 1 is recognized as the first spatial element $Q_2$. Here, the Minkowski sum of the two regions having the geometric characteristics in the element space corresponding to the geometric characteristics of the robot 1 and the object 2 is recognized as the first spatial element $Q_2$. In the case where the robot 1 and the object 2 are defined as a first region $q_1$ of a circular shape having a radius $r_1$ and a second region $q_2$ of a circular shape having a radius $r_2$, respectively, as shown in FIG. 6(a), the Minkowski sum of these two regions, $q_1+q_2$, represented as a circular region as shown in FIG. 6(b), is recognized as the first spatial element $Q_2$. When the first region $q_1$ is moved around the second region $q_2$ in such a manner that the center of the first region $q_1$ follows the contour of the second region $q_2$, the sum of the second region $q_2$ and the ring-shaped region of the first region $q_1$ running off the edge of the second region $q_2$ corresponds to the Minkowski sum (=the circular region having the radius $r_1+r_2$). The shape and size of the first region $q_1$ are prestored in the memory in response to the size (or the shape and size) of the robot 1, and recognized by reading them from the memory. The second region $q_2$ is recognized as the region having the spatiality corresponding to the size (or the shape and size) of the object 2 recognized from the images obtained by the head cameras $C_1$ and the like. Alternatively, the second region $q_2$ as it is may be recognized as the first spatial element $Q_2$, or the second region $q_2$ expanded in accordance with the size or other geometric characteristics of the first region $q_1$ using a method other than the Minkowski sum may be recognized as the first spatial element $Q_2$.

The second processing element 12 carries out "second processing" (S020 in FIG. 3). Specifically, the second processing element 12 determines whether the first spatial element $Q_2$ satisfies a "first contact condition" regarding the movement cost from the reference spatial element $Q_1$ in the element space QS (S022 in FIG. 3).

The movement cost is evaluated by the second processing element 12 as a function of one or both of the required time for and the moving distance of the reference spatial element $Q_1$ until it comes into contact with the first spatial element $Q_2$ in the element space QS. Specifically, the distance in a straight line or the distance d along the target path (dashed line) $R_k$ between the reference spatial element $Q_1$ and the first spatial element $Q_2$, the time $t=(d/|\{v_2-v_1|\})$ required for the reference spatial element $Q_1$ to contact the first spatial element $Q_2$ with the reference spatial element $Q_1$ and the first spatial element $Q_2$ moving while maintaining the first velocity $v_1$ and the second velocity $v_2$, respectively, shown in FIG. 5, or an increasing function of one or both of the above-described distance d and the required time t, is evaluated as the movement cost. For example, the first contact condition that "the movement cost falls within the prescribed range of $\{0, \epsilon_{+(>0)}\}$" is adopted.

Further, if the second processing element 12 determines that the first spatial element $Q_2$ satisfies the first contact condition (YES in S022 in FIG. 3), it determines whether the first spatial element $Q_2$ satisfies a "second contact condition" regarding the positional relationship with the target path $R_k$ (S024 in FIG. 3).

For example, assuming the case where the second contact condition that "there is an intersection point or a contact point with the target path $R_k$" has been adopted, in the situation shown in FIG. 5, the first sec-end-spatial element $Q_2$ intersects the target path $R_k$ of the robot 1, and thus, it is determined that the second contact condition is satisfied. Alternatively, the following may be adopted as the second contact condition: "that the accumulation or integration along a part or a whole of the shortest distance to the first spatial element $Q_2$ or the target path $R_k$ thereof is not greater than a predetermined value", "that there is an intersection point or a contact point between the tangent line of the target path $R_k$ at the first position $p_1$ (extending in the traveling direction of the reference spatial element $Q_1$) and the first spatial element $Q_2$", or the like.

If the second processing element 12 determines that the first spatial element $Q_2$ satisfies the second contact condition in addition to the first contact condition (YES in S024 in FIG. 3), it recognizes the first spatial element $Q_2$ expanded based on the recognition result of the first processing element 11 as an a second spatial element $EQ_2$ (S026 in FIG. 3). For example, when the first spatial element $Q_2$ shown on the left in FIG. 7(a) is continuously enlarged in the direction corresponding to the relative velocity (vector), $v_2-v_1$, of the second velocity $v_2$ with respect to the first velocity $v_1$, the resultant, approximately straight band-shaped region shown on the right in FIG. 7(a) is recognized as the second spatial element $EQ_2$. How much the first spatial element $Q_2$ is to be enlarged is set in accordance with the following expression (1), based on the second velocity $v_2$ of the first spatial element, the second position $P_2$ (or the relative second position $P_2-P_1$ with respect to the first position $p_1$), and the relative velocity $v_2-v_1$.

$$(\text{Enlarged Amount})=|P_2||V_2|/|v_2-v_1| \quad (1)$$

Alternatively, when the first spatial element $Q_2$ shown on the left in FIG. 7(b) is continuously enlarged so as to turn around in accordance with the relative velocity $v_2-v_1$, the resultant, bent band-shaped region shown on the right in FIG. 7(b) is recognized as the second spatial element $EQ_2$. In the above-described situation shown in FIG. 5, the second spatial element $EQ_2$ as shown in FIG. 8(b) is recognized. Still alternatively, the first spatial element $Q_2$ shown on the left in FIG. 7(c) may be intermittently enlarged in the direction corresponding to the relative velocity $v_2-v_1$, and the resultant, discrete spatial elements shown on the right in FIG. 7(c) may be recognized as the second spatial element $EQ_2$. The second processing element 12 further recognizes one of a plurality of expanded spatial elements $Q_{3i}$ (i=1, 2, . . . ) arranged around the first spatial element $Q_2$ that satisfies a requirement regarding the size in the element space QS as a third spatial element $Q_{3+}$, based on the recognition result of the first processing element 11 (S028 in FIG. 3).

For example, as shown in FIG. 8(a), four circular regions circumscribing the first spatial element $Q_2$ in front and back and left and right, with the advancing direction of the first spatial element $Q_2$ as the front, are set as the expanded spatial elements $Q_{31}$ to $Q_{34}$. Of these four expanded spatial elements $Q_{31}$ to $Q_{34}$, the expanded spatial element $Q_{32}$ in which the overlapping region with the element space QS (see the shaded portion in FIG. 8(a)) is the smallest in area is recognized as the third spatial element $Q_{3+}$. The area is measured according to the Monte Carlo method, for example. That is, dots are arranged at random in the element space QS, and the number of dots included in the respective expanded spatial elements (regions) $Q_{31}$ to $Q_{34}$ is counted, and the counted numbers are measured as the areas of the respective regions.

Figure 9:
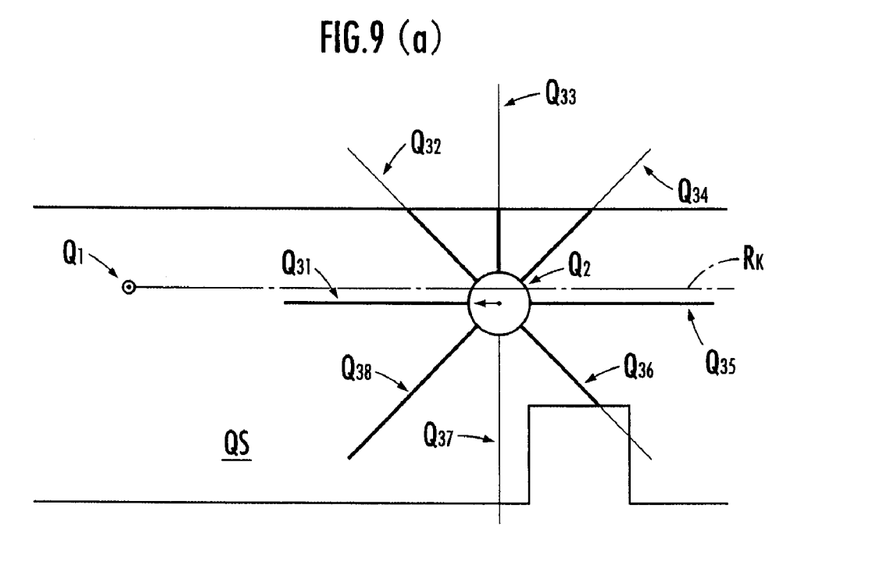
FIG. 9 illustrates another method of recognizing the third spatial element.

Alternatively, as shown in FIG. 9(a), eight line segments extending frontward, backward, leftward, rightward, and diagonally from the first spatial element $Q_2$, with the advancing direction of the first spatial element $Q_2$ as the front, may be set as the expanded spatial elements $Q_{31}$ to $Q_{38}$. Of these eight expanded spatial elements $Q_{31}$ to $Q_{38}$, the expanded spatial element $Q_{33}$ whose part continuing from the second space element $Q_2$ to the boundary of the element space QS (see the bold line portion in FIG. 9(a)) is the shortest may be recognized as the third spatial element $Q_{3+}$.

Still alternatively, from the standpoint that the robot 1 will pass through either side of the object 2, the expanded spatial elements $Q_{3i}$ may be set only on the sides of the object 2 in its advancing direction; that is, only the expanded spatial elements $Q_{32}$ and $Q_{34}$ in FIG. 8(a), or only the expanded spatial elements $Q_{33}$ and $Q_{37}$ in FIG. 9(a), may be set. The size of each expanded spatial element $Q_{3i}$ (diameter in the case of the circular region, length in the case of the line segment) is set as appropriate from the standpoint of preventing contact between the robot 1 and the object 2. Further, the size of each expanded spatial element $Q_{3i}$ may be set in a variable manner in accordance with the magnitude of velocity of the object 2 or the like. The expanded spatial element $Q_{3i}$ may take a variety of shapes besides the circular shape or the line segment, which may be a fan shape, rectangular shape, trapezoidal shape, or the like. Furthermore, the plurality of expanded spatial elements $Q_{3i}$ may differ in shape and/or size from each other.

Of the plurality of expanded spatial elements $Q_{3i}$, the one satisfying the requirement that its size is not greater than a threshold value, instead of the requirement that it is the smallest in size, may be recognized as the third spatial element $Q_{3+}$.

If it is determined that the first or second contact condition is not satisfied (NO in S022 and S024 in FIG. 3), it is determined whether the robot 1 terminates its movement (S040 in FIG. 3), as will be described later.

Further, the third processing element 13 carries out "third processing" (S030 in FIG. 3). Specifically, the third processing element 13 sets a path that allows the reference spatial element $Q_1$ to prevent contact with the first spatial element $Q_2$ and the third spatial element $Q_{3+}$ in the element space QS, based on the recognition results of the first processing element 11 and the second processing element 12 (S032 in FIG. 3). This path is set as a target path $R_{k+1}$ of the robot 1 in the real space or the passable region (S034 in FIG. 3). In this manner, the path $R_{k+1}$ preventing contact with the second spatial element $EQ_2$ and the third spatial element $Q_{3+}$, as shown by the dashed line in FIG. 8(b) or FIG. 9(b) for example, is set as a new target path for the robot 1.

Figure 10:
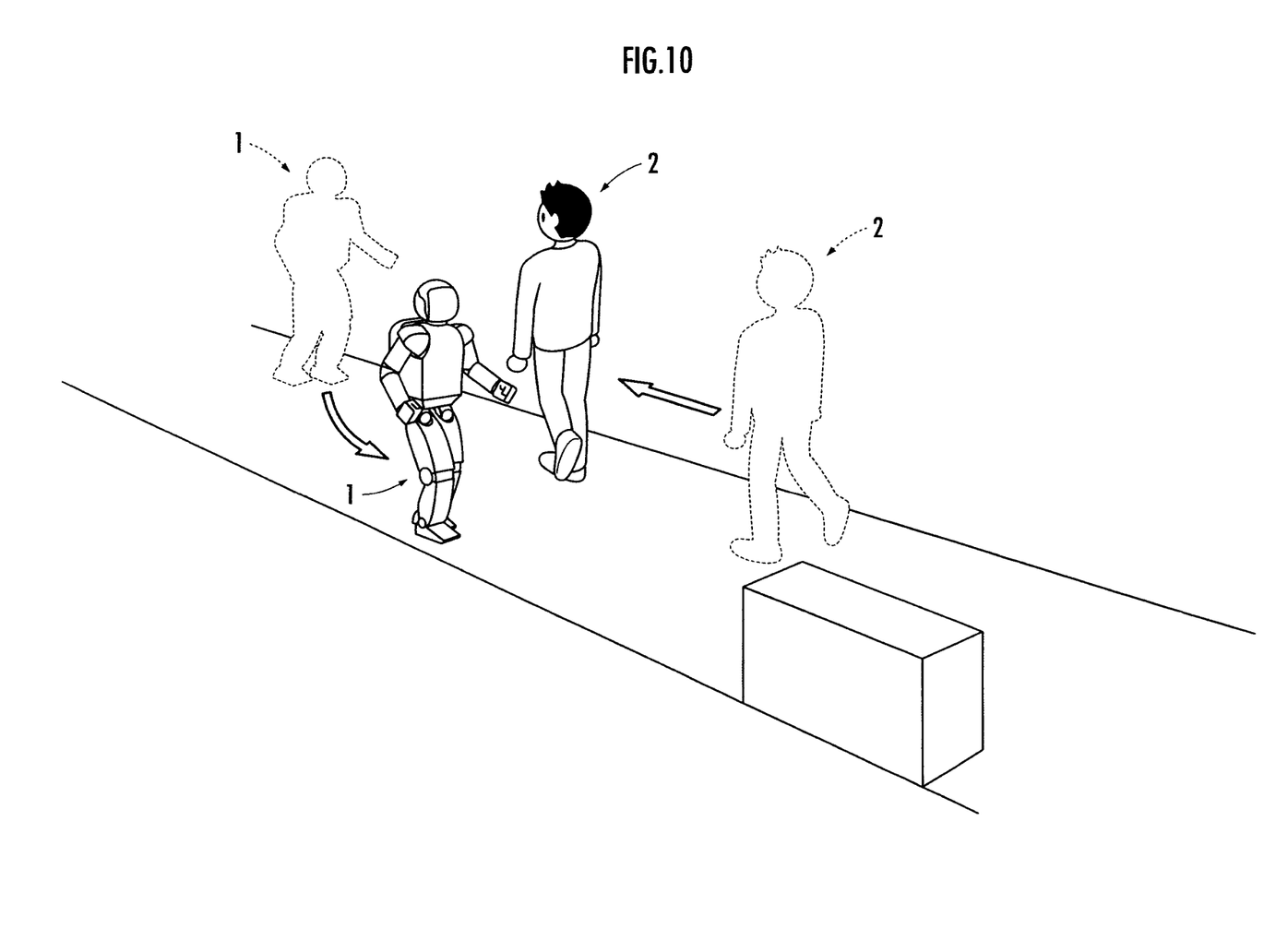
FIG. 10 illustrates how the robot moves.

The current supplied to the actuators M is adjusted to cause the robot 1 to move along the latest target path $R_{k+1}$, for control of the operation of the robot 1. This causes the robot 1 to change the traveling direction slightly to the right and continue to move so as to pass through the left side of the object 2, as shown in FIG. 10.

It is then determined by the control device 10 whether the robot 1 terminates its movement (S040 in FIG. 3). For example, it is determined whether the distance $|p_d-p_1|$ between the first position $p_1$ and the target position $p_d$ of the reference spatial element $Q_1$ in the element space QS has become not greater than a threshold value .delta.. If the result of determination is negative (NO in S040 in FIG. 3), the first through third processing as described above are carried out repeatedly. If the result of determination is positive (YES in S040 in FIG. 3), the series of processing is completed.

According to the robot 1 exerting the above-described functions, a path that can prevent contact with the third spatial element $Q_{3+}$ that satisfies the requirement regarding the size in the element space QS, among the plurality of expanded spatial elements $Q_{3i}$ arranged around the first spatial element $Q_2$ (see FIGS. 8(a) and 9(a)), is set as the target path $R_{k+1}$. The sizes of the expanded spatial elements $Q_{3i}$ arranged around the first spatial element $Q_2$ in the element space QS vary according to the width of the clearance between the object 2 recognized as the first spatial element $Q_2$ and the boundary of the passable region recognized as the element space QS (see FIGS. 4 and 5).

Accordingly, it is possible to cause the robot 1 to move in accordance with a consistent rule that is modified in response to the width of the clearance between the object 2 and the boundary of the passable region. For example, it is possible to cause the robot 1 to move in accordance with the consistent rule that it moves to the region where the clearance between the object 2 and the boundary of the passable region is wider (see FIGS. 5, 8(b) and 9(b)). This allows the object 2 such as a human being to predict that the robot 1 will move to the region where the clearance between the object 2 and the boundary of the passable region is wider. Consequently, it is possible to encourage the object 2 to make an appropriate behavior or behavioral change such as slightly moving the body to the right from the state as shown in FIG. 4 based on the above prediction, for the purposes of preventing contact with the robot 1, without causing the object 2 to feel uncomfortable.

Figure 7:
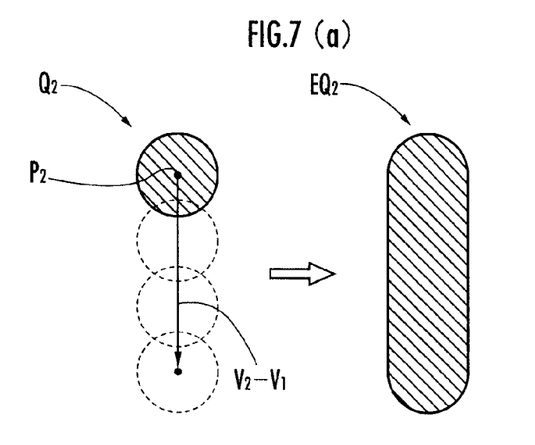
FIG. 7 illustrates a method of recognizing a second spatial element.

Further, the first spatial element $Q_2$ expanded based on the behavioral states of the reference spatial element $Q_1$ and the first spatial element $Q_2$ in the element space QS is recognized as the second spatial element $EQ_2$ (see FIGS. 7(*a*) to (*c*)). The behavioral state of the first spatial element $Q_2$ is specified according to a part or all of the position, velocity, acceleration and the like that change over time. This allows the second spatial element $EQ_2$ to be recognized as a spatial element greater in size or spatiality than the first spatial element $Q_2$.

Figure 8:
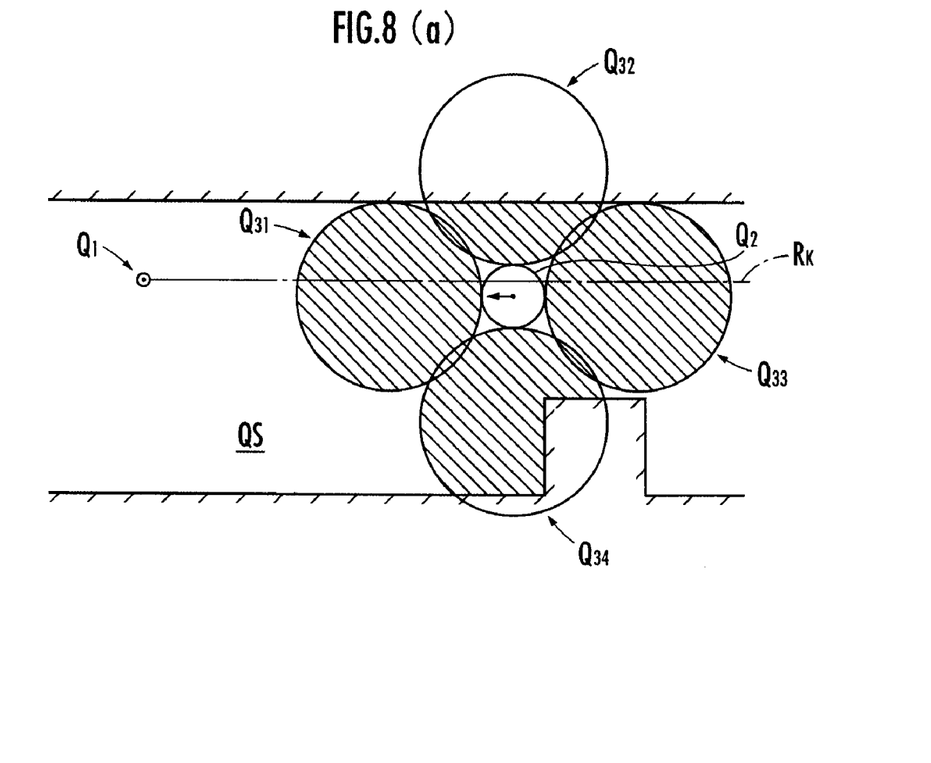
FIG. 8 illustrates a method of recognizing a third spatial element.

Furthermore, the target path $R_{k+1}$ that allows the reference spatial element $Q_1$ to prevent contact with the second spatial element $EQ_2$ is set (see FIGS. 8(*b*) and 9(*b*)). Thus, compared to the case where the target path that can prevent the reference spatial element $Q_1$ from contacting the first spatial element $Q_2$ or other spatial element smaller than the second spatial element $EQ_2$ is set, a more appropriate target path $R_{k+1}$ is set from the standpoint of more reliably preventing the robot 1 from contacting the object 2 in consideration of the behavioral state of the object 2.

In the element space QS, the first spatial element $Q_2$ is recognized as the spatial element smaller in size or spatiality than the second spatial element $EQ_2$, and the requirement for setting a new target path $R_{k+1}$ is that there is a possibility that the reference spatial element $Q_1$ may contact the first spatial element $Q_2$ (see S022, S024 and S030 in FIG. 3). Therefore, compared to the case where the requirement for setting a new target path $R_{k+1}$ is that there is a possibility that the reference spatial element $Q_1$ may contact the second spatial element $EQ_2$ or other spatial element having the size greater than that of the first spatial element $Q_2$, the frequency of change of the target path $R_k$, and hence, the frequency of behavioral change of the robot 1 such as a change of direction, is restricted low. This reduces the possibility that the behavioral change of the robot 1 would induce the behavioral change of the object 2, which would rather increase the possibility of contact therebetween.

Further, the shape and size of the first spatial element $Q_2$ in the element space QS may be recognized by referring to the database or the like. This prevents the undesirable situation where the object 2 is recognized as the first spatial element $Q_2$ having spatiality in the element space too large in view of its actual size due to the limitation of measurement accuracy of the size (or the shape and size) of the object 2 by the head cameras $C_1$ and the like. The frequency of change of the target path $R_k$ and the frequency of change of the traveling direction of the robot 1 accompanying the change of the path are restricted low. In other words, the undesirable situation where the target path $R_k$ of the robot 1 is changed frequently due to the limitation of recognition accuracy of the geometric characteristics of the object 2 through the head cameras $C_1$ and the like, is prevented. In the case where the lower limit of the prescribed range regarding the movement cost is set to a positive value instead of "0", the first contact condition is not satisfied if the movement cost is less than the lower limit, and the target path $R_k$ is not changed (see S022 in FIG. 3). This prevents the traveling direction of the robot 1 from being changed in the state where the behavioral change of the robot 1 may induce the behavioral change of the object 2 because the object 2 is near the robot 1, thereby rather increasing the possibility of contact therebetween.

Figure 6:
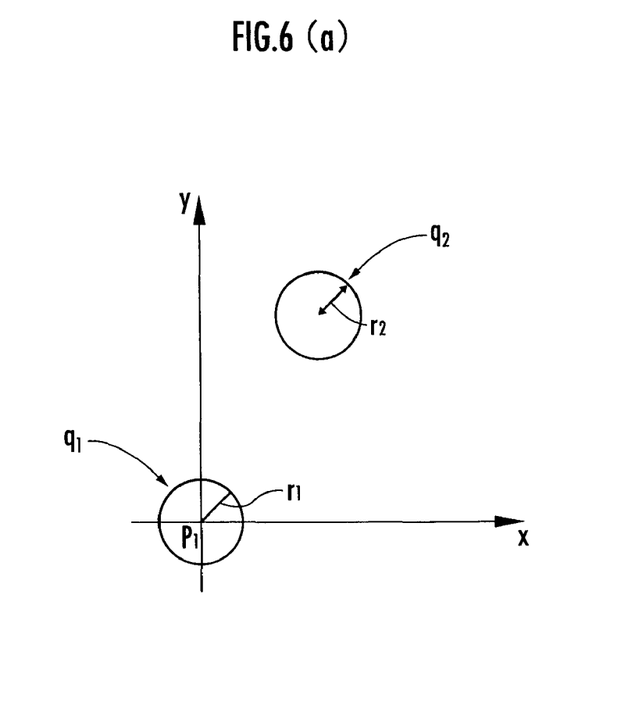
FIG. 6 illustrates a method of recognizing a first spatial element.

Furthermore, the Minkowski sum $q_1+q_2$ of the two regions corresponding to the geometric characteristics of the robot 1 and the object 2, respectively, is recognized as the first spatial element $Q_2$ (see FIGS. 6(*a*) and (*b*)). Thus, the sizes and shapes of the robot 1 and the object 2 are collectively reflected to the size and shape of the first spatial element $Q_2$ in the element space. This enables simple representation of the reference spatial element $Q_1$ as a point or a small region in the element space QS, and facilitates determination of presence/absence of the first spatial element $Q_2$ that may contact the reference spatial element $Q_1$, with the determination accuracy improved or maintained.

It is noted that the above-described control method may be applied to any apparatus having a mobile function, such as a robot that moves with the operations of more than two legs, a wheeled mobile robot (automobile) and the like, besides the robot that moves with the operations of the pair of left and right legs $P_3$ as in the robot 1.

While the expanded spatial element $Q_{3i}$ satisfying the requirement that the size in the element space QS is the smallest or not greater than a threshold value has been recognized as the third spatial element $Q_{3+}$ in the above embodiment (see FIGS. 8(*a*) and (*b*), and 9(*a*) and (*b*)), as another embodiment, the expanded spatial element $Q_{3i}$ satisfying the requirement that the size in the element space QS is the largest or exceeding a threshold value may be recognized as the third spatial element $Q_{3+}$.

What is claimed is:

1. A mobile apparatus autonomously moving along a target path, comprising:
    a first processing element which recognizes a position of a boundary of a region where the mobile apparatus is passable, the mobile apparatus and a position thereof, and an object and a position thereof, as a position of a boundary of an element space, a reference spatial element and a position thereof, and a first spatial element and a position thereof, respectively;
    a second processing element which, based on the position of the boundary of the element space and the first spatial element and the position thereof included in a recognition result of the first processing element, selects one of an expanded spatial element and a position thereof, among a plurality of expanded spatial elements arranged around the first spatial element, satisfying a requirement that a size in the element space is minimum or is equal to or less than a threshold value as a third spatial element and the position thereof; and
    a third processing element which, based on the position of the boundary of the element space, the reference spatial element and the position thereof, and the first spatial element and the position thereof included in the recognition result of the first processing element and based on the third spatial element and the position thereof included in a selection result of the second processing element, sets a path that allows the reference spatial element to prevent contact with the first spatial element and the third spatial element in the element space as the target path.

2. The mobile apparatus according to claim 1, wherein
    the second processing element regards a plurality of regions of same shape and same area arranged at an equal distance from the first spatial element as the plurality of expanded spatial elements, and regards an overlapping area of each of the plurality of regions with the element space as the size of the expanded spatial element, for recognition of the third spatial element.

3. The mobile apparatus according to claim 1, wherein
    the second processing element regards a plurality of line segments of same shape extending from the first spatial element in different directions as the plurality of expanded spatial elements, and regards a length of a part of each of the plurality of line segments continuing from the first spatial element to the boundary of the element space as the size of the expanded spatial element, for recognition of the third spatial element.

4. The mobile apparatus according to claim 1, wherein
the first processing element recognizes a changing pattern of a relative position of the object with respect to the mobile apparatus as a changing pattern of a relative position of the first spatial element with respect to the reference spatial element in the element space,
the second processing element, based on the position of the boundary of the element space, the first spatial element and the position thereof, and the changing pattern of the relative position of the first spatial element with respect to the reference spatial element included in the recognition result of the first processing element, recognizes a spatial element and the position thereof as a result of expanding the first spatial element intermittently or continuously in accordance with the changing pattern of the relative position in the element space as a second spatial element and the position thereof, and
the third processing element, based on the position of the boundary of the element space included in the recognition result of the first processing element, and based on the second spatial element and the position thereof and the third spatial element and the position thereof included in the recognition result of the second processing element, sets a path that allows the reference spatial element to prevent contact with the third spatial element and with the second spatial element in the element space as the target path.

5. The mobile apparatus according to claim 4, wherein
the second processing element determines whether there is a possibility of contact between the reference spatial element and the first spatial element in the element space based on the position of the boundary of the element space, the reference spatial element and the position thereof, and the first spatial element and the position thereof included in the recognition result of the first processing element, and
the third processing element newly sets the target path on the condition that the second processing element determines that there is the possibility of contact.

6. A program recorded on a computer-readable medium causing a computer mounted on a mobile apparatus autonomously moving along a target path to function as the system for controlling the operation of the mobile apparatus as recited in claim 1.

7. The mobile apparatus according to claim 1, wherein the plurality of expanded spatial elements do not overlap the first spatial element.

8. A method for controlling an operation of a mobile apparatus autonomously moving along a target path, the device executing:
a first process of recognizing a position of a boundary of a region where the mobile apparatus is passable, the mobile apparatus and the position thereof, and an object and the position thereof, as a position of a boundary of an element space, a reference spatial element and the position thereof, and a first spatial element and the position thereof, respectively;
a second process of, based on the position of the boundary of the element space, and the first spatial element and the position thereof from a recognition result of the first process, selecting one of an expanded spatial element and the position thereof, from a plurality of expanded spatial elements arranged around the first spatial element, that satisfies a requirement that a size in the element space is minimum or is equal to or less than a threshold value as a third spatial element and the position thereof; and
a third process of, based on the position of the boundary of the element space, the reference spatial element and the position thereof, and the first spatial element and the position thereof included in the recognition result of the first process, and based on the third spatial element and the position thereof included in a selection result of the second process, setting a path that allows the reference spatial element to prevent contact with the first spatial element and the third spatial element in the element space as the target path.

9. The method according to claim 8, wherein the plurality of expanded spatial elements do not overlap the first spatial element.

* * * * *